Patented Feb. 3, 1948

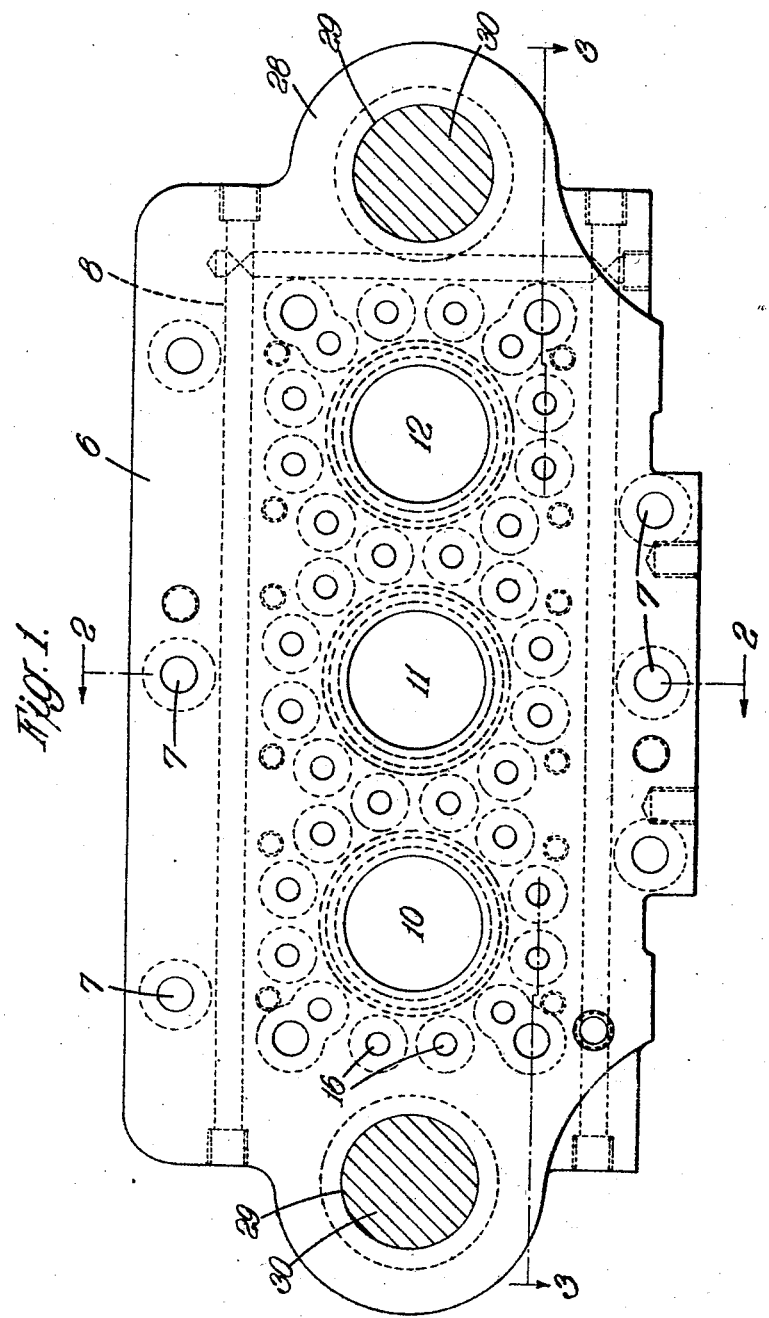

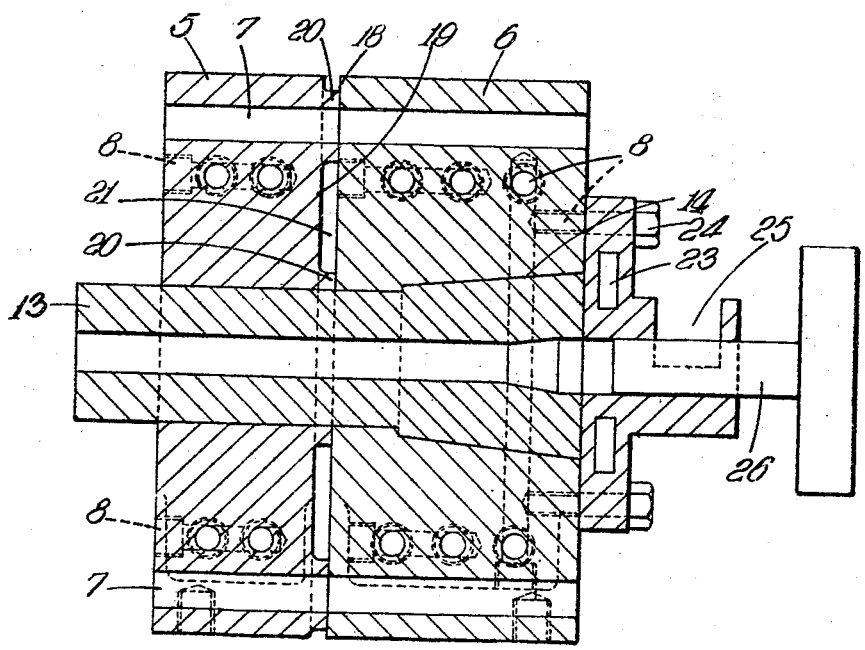

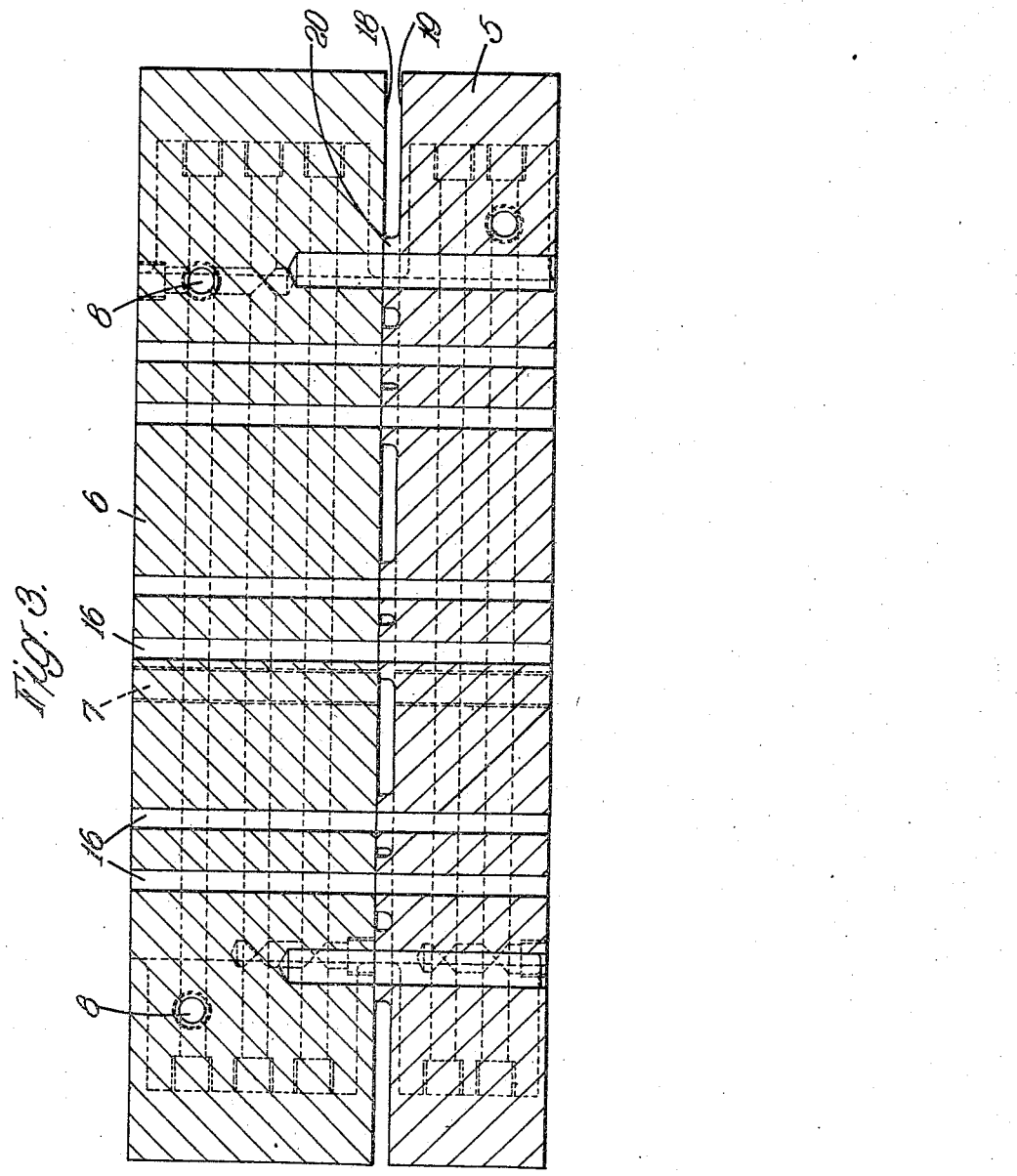

2,435,426

UNITED STATES PATENT OFFICE 2,435,426

EXTRUSION MACHINE

Drury Norman Davies, Feltham, England, assignor to Cellomold Limited, Feltham, England Application June 21, 1943, Serial No. 491,683
In Great Britain July 27, 1942

1 Claim. (Cl. 18—12)

This invention relates to extrusion machines for the extrusion of thermoplastic and thermosetting resinous materials such as cellulose acetate thermoplastic moulding powders, e. g., "Cellomold," and phenol-formaldehyde thermosetting moulding powders, e. g., "Rockite."

Extrusion is commonly carried out by feeding the material in powder form into a die chamber from which it is fed to the die by a reciprocating plunger actuated by a hydraulic ram, and the die is located in a chase (i. e., die holder or bolster) which is bolted to the face of a press-table or cross-head carried by the frame, (e. g., main columns or bed) of the machine. In order to increase the output of extrusions we now consider it to be desirable to provide the machine with two or more die bores each with their own die chamber and reciprocating plunger, all the plungers being actuated from a common hydraulic supply and valve mechanism. However, the attachment of two or more chases to the table would be a complicated matter. The ordinary type of press-table can, however, be dispensed with by forming the press-table itself with one or more apertures each to receive a die so that the press-table becomes the die chase, and this arrangement has the advantage of enabling the length of the apparatus to be reduced and thus the cost of the apparatus also. The two or more chases can be cast in a single integral casting. A difficulty still remains however for the following reason: in machines for extruding thermoplastic resins it is necessary to control the temperature of the die so that the material is heated to the temperature necessary to give it the required viscosity and at the outlet end of the die the material must be cooled sufficiently to set hard before leaving the die. In the extrusion of thermosetting resins the control of the heat gradient along the die is even more difficult; the gradient is in the opposite direction so that the material is first compacted warm, but not too warm, and then its temperature must be increased just prior to shaping and finally its temperature must be raised to about 180° C. to harden the resin to the final infusible resite stage. Failure to control the temperature gradient will quickly lead to difficulties such as seizure of the material in the die which may be accompanied by a fracture of parts of the machine. The use of a press-table as a die chase involves a large mass of metal especially when it is adapted to carry two or more dies, and this mass of metal is difficult to heat in such a way as to control the temperature gradient along the dies carried in the die chase. According to the present invention, therefore, the apparatus comprises a press-table mounted on the frame of the apparatus and having at least one aperture therethrough adapted to receive a die said press table thus constituting a die chase, and the press-table is made in two or more transverse sections which are fixed together with a heat insulation between them. By this means it is possible to keep one end of the dies cool and the other end hot, or to maintain the required temperatures or temperature gradient at the various positions along the dies. The press-table may be cast without a longitudinal division so as to form one or more castings, each having bore holes for two or more dies. The heat insulation may be provided by machining out air gaps in one or each of the mating faces of the press-table castings leaving raised bosses around the die bores and around such other bores as may be provided. External surfaces may be suitably "lagged" to assist in maintaining the desired temperatures.

In order that the invention may be readily understood and carried into effect, a constructional form thereof will now be described by way of example with reference to the accompanying drawings, in which Figure 1 is an end view of a bipartite chase made in accordance with the invention, viz., looking in the extrusion direction, Figure 2 is a sectional view on line 2—2 on Figure 1 but showing also the die and certain other parts attached, and Figure 3 is a sectional view on line 3—3 on Figure 1.

The press-table comprising both cross-head and chase consists of two parts 5 and 6, which are connected together by bolts (not shown) which pass through the bores 7. Both parts of the chase are formed with extensions 28 on both sides, which are bored at 29 so that they can be mounted on two horizontal main supporting columns 30 of the machine instead of attaching the chase castings to the usual separate table mounted on said columns.

Both parts of the chase are drilled with appropriate channels 8 which are to be connected to a suitable source of supply of steam through appropriate valves to control the rate of supply, and thus to control the temperature of the parts 5 and 6 independently.

As will be seen from Figures 1 and 3, the chase in this example is formed with apertures 10, 11, and 12, to receive the dies, one of which is shown in Figure 2 at 13. The apertures 10, 11, and 12, have a tapered part at 14 which ensures that when split dies are used the two halves are held firmly together. Surrounding each of the die apertures 10, 11, and 12, are a series of small bores 16 passing through the chase and adapted to receive electric pencil type heater elements which are inserted from the exit end of the die and of which long ones supply heat to both parts of the chase and thus to both ends of the die while short ones do not extend beyond the part 5 and supply additional heat only to the exit end of the die when working on thermosetting materials. The electric wiring can be arranged so that any desired combination of elements is in operation. The elements may be coupled in groups with suitable switched and thermostatic controls to suit the work and temperatures required.

In order to prevent undue heat transmission between the parts 5 and 6 of the chase their mating areas are reduced to a minimum. This is effected by making the surface 18 of the part 6 a plane surface whilst the surface 19 of the part 5 is machined with bosses 20 surrounding the various bores or apertures that pass through the chase thereby leaving air gaps 21 providing a heat insulating layer between the parts 5 and 6. Other heat insulating or packing material may be provided between the parts 5 and 6 if desired.

Attached to the forward end of the part 6 by bolts 24 are cooling boxes 23, one for each die, through which water is circulated and by means of which additional control on the temperature of the part 6 can be effected. The cooling boxes have feed openings 25 and receive the punch or plunger 26 which is reciprocated to drive the material through the die. The cooling boxes also serve to hold the dies in the chase. The three punches 26 may be operated by a common hydraulic ram.

By the various means described above it is possible to obtain any desired temperature gradients along the dies in the direction of extrusion within the range of the apparatus. Any one die may be used independently or two or more dies may be in use simultaneously, and different temperature conditions may exist in dies used simultaneously.

The invention can also be employed with advantage in a chase carrying a single die.

I claim:

An extrusion apparatus for extruding thermosetting materials comprising at least two main horizontal supporting columns, a press table consisting of at least two parts having apertures through which said columns pass whereby the table is rigidly supported, bolts engaged in bolt holes in said parts whereby said parts are fixed together in contact with each other, die-receiving apertures in both said parts forming a continuous die-receiving aperture, a die located in said aperture said die having an internal bore, a channel in each of said parts each channel being independent of the other whereby it is adapted to contain a heating medium of different temperature from the other, bosses on one at least of said parts which bosses surround the said apertures and holes whereby recesses are provided between the bosses so as to provide a transverse heat insulation between the two parts, means for cooling the material at the inlet end of the press table, the meeting surfaces of the parts being disposed at some distance from the said cooling means and at a part of the die bore which has the final cross-sectional shape of the finished extrusion.

DRURY NORMAN DAVIES.

REFERENCES CITED

The following references are of record in the file of this patent:

UNITED STATES PATENTS

| Number | Name | Date |
|---|---|---|
| 2,043,584 | Husted | June 9, 1936 |
| 2,227,263 | Knowles | Dec. 31, 1940 |
| 2,322,200 | Tucker | June 15, 1943 |
| 2,117,179 | Kopp | May 10, 1938 |
| 2,143,549 | Edmonds | Jan. 10, 1939 |
| 1,770,396 | Fuller et al. | July 15, 1930 |
| 2,202,140 | Burroughs | May 28, 1940 |
| 2,233,987 | Orsini | Mar. 4, 1941 |
| 613,856 | Dickson | Nov. 8, 1898 |
| 688,629 | Sutherland | Dec. 3, 1901 |

FOREIGN PATENTS

| Number | Country | Date |
|---|---|---|
| 401,428 | Great Britain | Nov. 16, 1933 |
| 409,330 | Great Britain | Apr. 30, 1934 |